US009450757B2

(12) United States Patent
Modarresi et al.

(10) Patent No.: US 9,450,757 B2
(45) Date of Patent: Sep. 20, 2016

(54) METHOD AND DEVICE FOR COMMUNICATION SECURITY

(71) Applicant: Oxcept Limited, London (GB)

(72) Inventors: Shawn Modarresi, San Francisco, CA (US); Bangdao Chen, Oxford (GB)

(73) Assignee: OXCEPT LIMITED, London (GB)

( * ) Notice: Subject to any disclaimer, the term of this patent is extended or adjusted under 35 U.S.C. 154(b) by 0 days.

(21) Appl. No.: 14/272,407

(22) Filed: May 7, 2014

(65) Prior Publication Data

US 2015/0326398 A1    Nov. 12, 2015

(51) Int. Cl.
*H04L 29/06* (2006.01)
*G06F 15/16* (2006.01)
*H04L 9/32* (2006.01)

(52) U.S. Cl.
CPC ............... *H04L 9/32* (2013.01); *H04L 9/3242* (2013.01); *H04L 63/08* (2013.01)

(58) Field of Classification Search
None
See application file for complete search history.

(56) References Cited

U.S. PATENT DOCUMENTS

| | | | | |
|---|---|---|---|---|
| 5,930,767 | A * | 7/1999 | Reber et al. | 705/26.41 |
| 7,039,809 | B1 * | 5/2006 | Wankmueller | G06Q 20/401 705/72 |
| 7,146,500 | B2 * | 12/2006 | Hawkins et al. | 713/176 |
| 7,757,274 | B2 * | 7/2010 | Lillie et al. | 726/4 |
| 8,230,229 | B2 | 7/2012 | Roscoe et al. | |
| 8,572,382 | B2 * | 10/2013 | De Lutiis et al. | 713/170 |
| 2005/0265349 | A1 * | 12/2005 | Garg | H04L 29/06027 370/395.2 |
| 2005/0268334 | A1 * | 12/2005 | Hesselink | H04L 63/0209 726/11 |
| 2007/0118752 | A1 * | 5/2007 | Kiessling | G06F 21/305 713/176 |
| 2007/0157309 | A1 * | 7/2007 | Bin et al. | 726/15 |
| 2008/0071537 | A1 * | 3/2008 | Tamir et al. | 704/246 |
| 2008/0072052 | A1 * | 3/2008 | Suzuki | G06F 21/608 713/176 |
| 2008/0256151 | A1 * | 10/2008 | Acar | G06F 7/58 708/250 |
| 2009/0228705 | A1 * | 9/2009 | Cho | H04L 9/3226 713/158 |
| 2009/0249492 | A1 * | 10/2009 | Boesgaard Sorensen | G06F 21/556 726/27 |
| 2009/0313475 | A1 * | 12/2009 | Roscoe et al. | 713/181 |
| 2010/0115277 | A1 * | 5/2010 | Roscoe | 713/170 |
| 2010/0217983 | A1 * | 8/2010 | Umezuki | G06F 21/64 713/168 |
| 2010/0281331 | A1 * | 11/2010 | Hammons, Jr. | H04L 1/1812 714/752 |
| 2011/0010546 | A1 * | 1/2011 | Nakano | H04L 63/083 713/168 |
| 2011/0055585 | A1 * | 3/2011 | Lee | H04L 9/0844 713/183 |
| 2011/0087890 | A1 * | 4/2011 | Munsil | G06F 21/31 713/184 |
| 2012/0183139 | A1 * | 7/2012 | Matsuo | H04L 9/0844 380/255 |
| 2014/0223580 | A1 * | 8/2014 | Neivanov | H04L 9/3236 726/28 |

FOREIGN PATENT DOCUMENTS

WO    2008/078101 A2    7/2008

* cited by examiner

*Primary Examiner* — Abu Sholeman
*Assistant Examiner* — Maung Lwin
(74) *Attorney, Agent, or Firm* — Polsinelli PC (57) ABSTRACT

A method of authenticating communication between a first and second device over an insecure communications network, in which the first device authenticates the second device using a communications protocol including a first communications phase through a first communications channel over the insecure communications network to establish a secure mode of communications between the first and second device, followed by a second communications phase of receiving information from the second device over a second communications channel, such as an empirical channel, and enabling a comparison between the information received from the second device with information generated by the first device thereby enabling authentication of the second device in the event of the information from both devices is consistent.

20 Claims, 7 Drawing Sheets

METHOD AND DEVICE FOR COMMUNICATION SECURITY

TECHNICAL FIELD

The present disclosure relates generally to improvements in communication security.

BACKGROUND

Internet of things (IOT) is a network to connect articles and the Internet to carry out information exchange and communication and achieve intelligent identification, positioning, tracking, monitoring and management. The usage of the IOT has become more and more popular in areas, such as appliance, intelligent traffic, health care, industrial monitoring, intelligence collection, etc. The IOT is integrated with the existing Internet to achieve the integration of the physical system and the human society.

However, communications over potentially insecure media such as the Internet can be intercepted and/or effected miscommunication thereby to gain access to confidential information, for example through malicious software on a user device and/or through some fraudulent online activity. Therefore, there is a need to enable a proper authentication process to provide a user with increased assurance of the security before exchanging confidential information.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for authenticating communication between a first and second device over an insecure communications network, in which the first device authenticates the second device using a communications protocol comprising a first communications phase through a first communications channel over the insecure communications network to establish a secure mode of communications between the first and second device, followed by a second communications phase of receiving information from the second device over a second communications channel, such as an empirical channel, and enabling a comparison between the information received from the second device with information generated by the first device thereby enabling authentication of the second device in the event of the information from both devices is consistent.

In some embodiments, a first and second device can be an appliance and a client computing device, respectively. The client computing device can take control of at least one function of the appliance over a first and second communications channels by using one or more security protocols disclosed herein, which include the Hash Commitment Before Knowledge (HCBK) family of protocols. A first communication channel may be established in a network (e.g., Internet, wide area network (WAN), local area network (LAN), wireless mesh network, Internet area network (IAN)). A second communication channel (e.g., an empirical channel) may include the use of LED laser light, infrared, ultrasonic, NFC, wired channel, audio channel, or the like.

In some embodiments, a public key, pkA, or a hash key (i.e., a random number) can be generated by an appliance, a client computing device and/or a trusted server. The public key and/or a long hash of the hash key can be shared between the appliance and the client computing device via a first communications channel or through the trusted server. The appliance and the client computing device can separately generate a digest value based at least upon the public key and/or the hash key, or the received information. The digest value can be communicated to the other device via a second communication channel. The appliance or the client computing device may be configured to authenticate the other device or each other by comparing a received digest value and a generated digest value.

In some embodiments, a computing device can initial an authentication process by transmitting its identification and other information for the purpose of this protocol to an appliance via a first communications channel in a communication network. In response, the appliance can send the computing device identification and other information of the appliance to the computing device via the communications network. The computing device can generate a hash key and send the appliance a long hash of the hash key via the communications network. Subsequently, the computing device can also send the appliance the hash key or the hash key under a shared public key via the communications network. In some instances, the appliance checks the value of the hash key to see whether it produces the correct value for the long hash of the hash key and proceeds the authentication process if this is true.

In some embodiments, the appliance can also generate a hash key and send a long hash of the hash key to the computing device. Subsequently, the appliance can send the hash key, or the hash key under a shared public key to the computing device via the communication network. The computing device can check the value of the hash key to see whether it produces the correct value for the long hash of the hash key and only proceed if this is true.

Based on received information, the appliance and the computing device can independently generate a digest value of the received information, for example, digest (the hash key(s), (identifications of the appliance and the computing device, information of the appliance and the computing device)). The digest value can be digits, hexadecimal, alphanumeric, sentences, words, names, symbols, barcodes, random arts, unique patterns, or the like. In some embodiments, the digest value generated by the computing device can be communicated to the appliance through a second communications channel (e.g., an empirical channel). The appliance can be configured to compare the received digest value from the computing device with a digest value generated on the appliance. In some embodiments, the digest value generated by the appliance is communicated to the computing device through a second communication channel. The computing device can be configured to compare the digest value from the appliance with a digest value generated on the computing device. If the check fails, the authentication process is abandoned. If the check is successful, the computing device can take control of at least one function of the appliance (e.g., send a secret key to open a lock).

In some embodiments, the digest value generated by the appliance may be communicated to the computing device by at least one output device of the appliance through the second communications channel (e.g., an empirical channel). The computing device or a user of the computing device can compare the received digest value from the appliance with a digest value generated on the computing device. In some embodiments, a symmetric authentication process can be applied. The digest values generated by the appliance and the computing device can be authenticated on the computing device and the appliance, respectively.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the present disclosure provide authenticating communication between a first and second device over an insecure communications network, in which the first device authenticates the second device using a communications protocol comprising a first communications phase through a first communications channel over the insecure, high bandwidth communications network to establish a secure mode of communications between the first and second device, followed by a second communications phase of receiving information from the second device over a second communications channel, such as an empirical channel, and enabling a comparison between the information received from the second device with information generated by the first device thereby enabling authentication of the second device in the event of the information from both devices is consistent. In some embodiments, this application provides means for authentication process, and subsequent secure communication, to be established.

Figure 1:
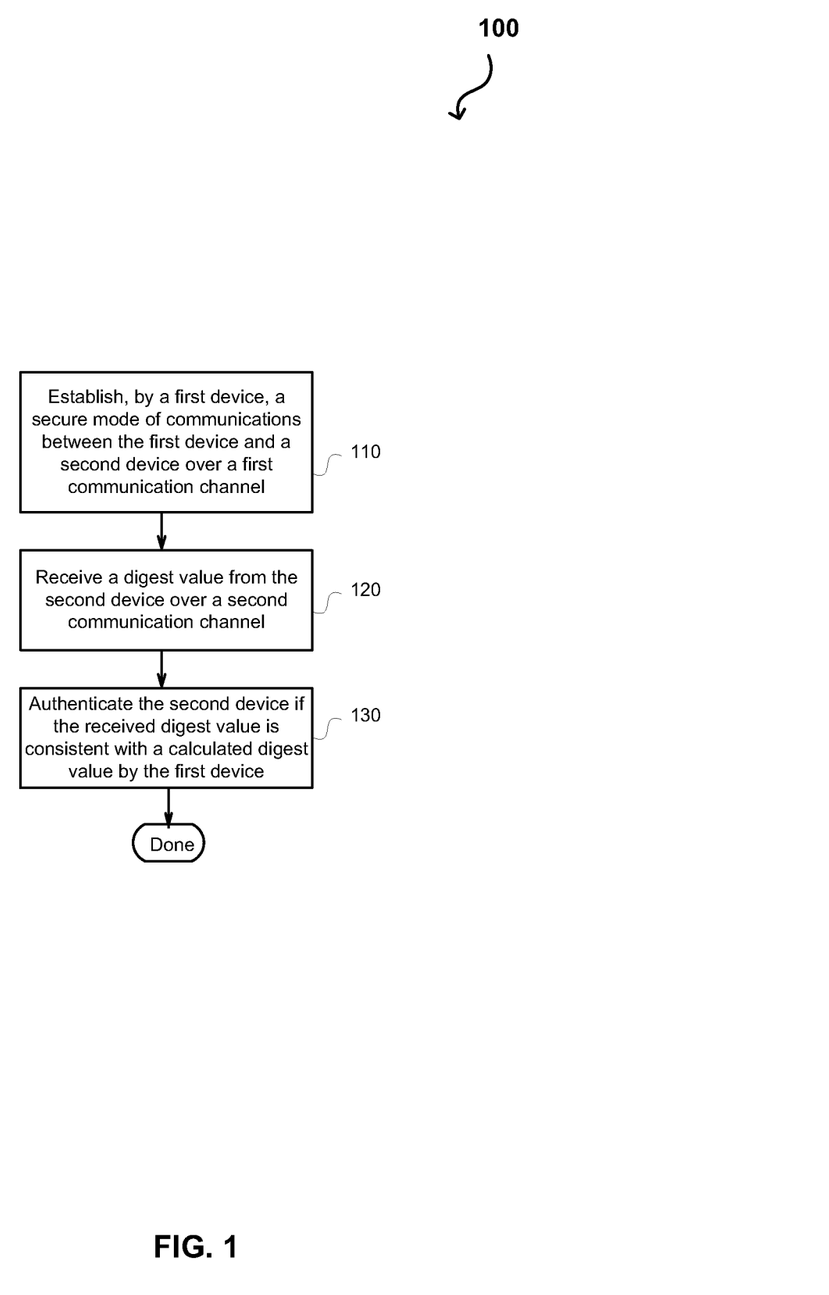
FIG. 1 illustrates an example process of authenticating communication via a first and second communication channels in accordance with various embodiments.

FIG. 1 illustrates an example process 100 of authenticating communication between a first and second device via a first and second communication channels in accordance with various embodiments. It should be understood that there can be additional, fewer, or alternative steps performed in similar or alternative orders, or in parallel, within the scope of the various embodiments unless otherwise stated. The example method embodiment 100 starts with establishing by a first device a secure mode of communications between the first device and second device over a first communication channel, at step 110. Either the first device or the second device can be a client device. The client device can include, for example tablet computers, personal data assistants (PDAs), smart phones, portable media file players, e-book readers, portable computers, head-mounted displays, interactive kiosks, mobile phones, net books, single-board computers (SBCs), embedded computer systems, wearable computers (e.g., watches or glasses), gaming consoles, desktop PCs, laptop computers, home-theater PCs (HTPCs), TVs, DVD players, digital cable boxes, digital video recorders (DVRs), computer systems capable of running a web-browser, or a combination of any two or more of these. The computing device may use operating systems that include, but are not limited to, Android, Berkeley Software Distribution (BSD), iPhone OS (iOS), Linus, OS X, Unix-like Real-time Operating System (e.g., QNX), Microsoft Windows, Window Phone, and IBM z/OS. In some embodiments, one of the first and second devices is an IOT device. The IOT device may be embedded and equipped into various objects such as, but are not limited to, appliances, power grid, oil and gas pipelines, automobiles, dams, water supply systems, highways, tunnels, bridges, and railways. The first communication channel may be in an insecure network, such as Internet, wide area network (WAN), local area network (LAN), wireless mesh network, Internet area network (IAN), or near field communication (NFC).

In some embodiments, the secure mode of communications may be established by using a protocol in a Hash Commitment Before Knowledge (HCBK) family of protocols. The HCBK protocol may include five authentication steps. In the first two steps, the first and second devices can separately generate a public key and/or a random value, and then send a longhash (i.e., a cryptographic hash function) of the random number, together with information of the first or second devices, to the other device via the first communication channel. The public key and the longhash may have suitable length that it is infeasible for a third party to decode either the public key or the longhash during the authentication process 100 or at least the first four steps of the protocol. Exclusive disjunction (i.e., XOR) between the random values generated on the first and second device may have a sufficient degree of cryptographic entropy such that it can be used to key the cryptographic digest used in a later step of the authentication process 100. The first and second steps are a commitment stage that both the first and second devices receive an unknown longhash.

In the third and fourth steps of the HCBK protocol, the first and second devices can send each other the random value and/or the public key. In some embodiments, upon receiving the random value and/or the public key, the first and second devices can check the value of the received random value or the public key to see whether it produces the correct value for the longhash of the random number and/or public key, and only proceeds the authentication process if this is true.

Based at least upon the random values, device information, or the public key, the first and second can separately generate a digest value. The digest value can be digits, hexadecimal, alphanumeric characters, sentences, words, names, symbols, barcodes, random arts, unique patterns, images, biometric data, or the like. The digest value (m, n) is a function of m and n such that, for any distinct n1 and n2, as m varies uniformly over c-bit value, the probabilities that digest (m,n1) equals (m,n2) is not substantially greater than $2^{-c}$. The length of c can be selected such that a probability of a successful attack rate of $2^{-c}$ is acceptable in the IOT application. In some embodiments, the digest value can be determined by digest (XOR of random values generated by the first and second devices, information of the first and second devices). In some instances, the digest value may also include the public key, and/or a proposed session key chosen randomly by either the first or second device that can be used for secure communication between the first and second devices subsequently to successful authentication process. In some embodiments, the HCBK protocol may include fewer or more steps to meet a suitable security requirement of the authentication process between the first and second device.

At step 120, the first device receives a digest value from the second device over a second communications channel (e.g., an empirical channel). The empirical channel may include the use of LED laser light, infrared, NFC, ultrasonic, wired channel, audio channel, https-based channel or the like. The second device can be authenticated if the received digest value is consistent with a calculated digest value by the first device, at step 130. In some embodiments, the first device also sends the digest value to the second device over the second communications channel. The first and second devices each compares the received digest value and the generated digest value and authenticates each other if the digest values match.

In some embodiments, a digest function output length can be calculated by digest (k, x), where x is an input value. As k varies uniformly over the set of c-tuples of bits, the probability that digest$(k \oplus \theta, x)$=digest$(k,y)$ is substantially small, where $\theta$ is a fixed key, and x and y are an arbitrary pair of distinct data. The smallest probability that can apply uniformly to all x and y is $2^{-c}$. In some embodiments, there may be no computationally feasible way in which a third party could increase this probability to more than $2^{-c}+\epsilon$, where $\epsilon$ is substantially smaller than $2^{-c}$.

In some embodiments, $\epsilon$ is substantially close to 0 if calculated according to the formula above using a Toeplitz matrix of independent uniform binary random variables. In practice the key k cannot be expected to be long enough to produce such large numbers of independent random variables. In some instances, k's size can be within the range of a typical cryptographic entropy (e.g., 160-512 bits) and k can be determined by using the result of seeding a high-quality pseudo-random number generator (PRNG) with k that instead of random binary bits.

The steps to determine a digest value by using a PRNG may include steps of: initializing a first and second memory store for storing strings of bits by shifting each of the lengths of bits in a predetermined manner; initializing the length of bits in each memory store with values functionally dependent on a key k; storing a first length of pseudo-random bits in a first store; storing a second length of bits of digest information in a second store; and operating on both the stored strings of bits in each of the first and second memory store to produce the digest value. These steps may be implemented by either a hardware circuit (e.g., a custom chip or field programmable gate array (FPGA)) or software.

In some embodiments, integer multiplication in half-word blocks is used in software implementations. Assuming that $r_i$ (i in $\{(1-D, 2-D, \ldots \}$) are a series of half-word pseudo-random blocks seeded by k, that $x_i$ are the half-word blocks of x, where the desired digest length is D half words in length, each bit of $x_i$ in the whole word $r_j * x_i$ has a direct influence. For each i, the half-word products of $x_i$ with the D+1 successive blocks $r_j$ can be calculated, where i-j is in the range $\{-1 \ldots D-1\}$. The upper half words of the products from the range $\{-1 \ldots D-2\}$ are EXCLUSIVE ORed (XORed) with the contents of accumulators to calculate the D output words, as are the lower half words of the products from the range $\{0 \ldots D-1\}$ (both in order, so the lower half word of the product $r_i * x_i$ aligns with the upper half word of the product $r_{j+1} * x_i$).

Figure 2:
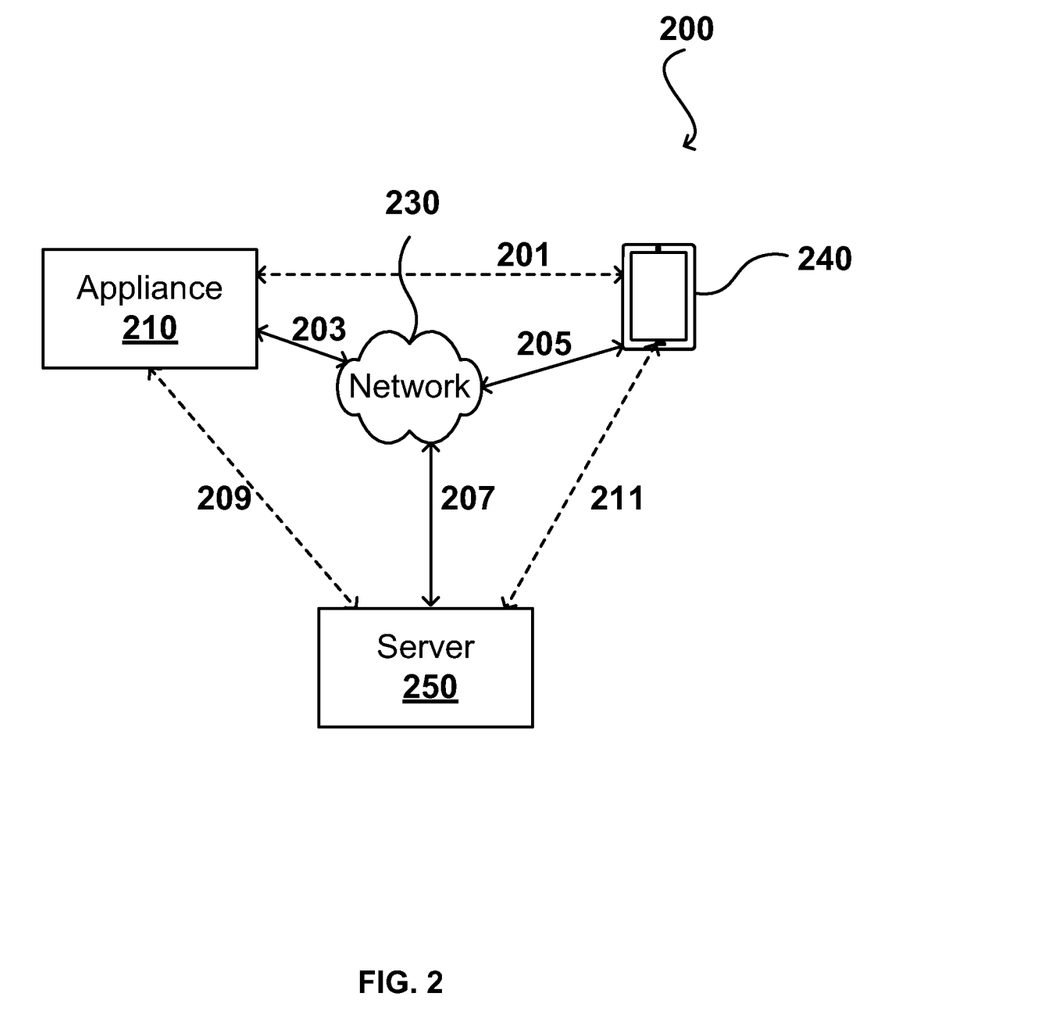
FIG. 2 illustrates an example security system in accordance with various embodiments.

FIG. 2 illustrates an example security system 200 in accordance with various embodiments. In this example, a client computing device 240 communicates with an appliance 210 via a network 230. Although only a cell phone is shown in FIG. 2, it should be understood that various other types of electronic or computing device that capable of receiving, or transmitting signals in accordance with various embodiments discussed herein. The computing device 240 may have one or more image capture elements (not shown), such as one or more cameras or camera sensors, to capture images and/or videos. The one or more image capture elements may include a charge-coupled device (CCD), an active pixel sensor in complementary metal-oxide-semiconductor (CMOS) or N-type metal-oxide-semiconductor (NMOS), an infrared or ultrasonic image sensor, or an image sensor utilizing other type of image capturing technologies. The computing device 240 may have one or more audio capture devices (not shown) capable of capturing audio data (e.g., word commands from a user or other devices) (not shown). The computing device 240 may also have one or more wireless components (not shown) operable to communicate with one or more electronic devices within a computing range of the particular wireless channel. The wireless channel can be any appropriate channel used to enable devices to communicate wirelessly, such as Bluetooth, cellular, NFC, Z-Wave, infrared, or Wi-Fi channels. It should be understood that the device can have one or more wired communications connections (e.g., a Universal Serial Bus (USB) connection) as known in the art.

In some embodiments, the appliance 210 may be any electrical and/or mechanical devices that accomplish some household functions, for example, but are not limited to, a door lock, automatic garage door opener, remote car starter, sprinkler system, safety box, thermostat, safety detector such as smoke, fire, or carbon monoxide alarms, air conditioner, dishwasher, clothes dryer, freezer, refrigerator, kitchen stove, water heater, washing machine, microwave ovens, induction cooker, TV set, CD/DVD player, camcorder, still camera, digital clock, alarm clock, video game console, home cinema, answering machine, etc. The appliance 210 includes at least one central processing unit (CPU), a network connector, and at least one output device, such as a display device (e.g., a LED, flat panel, liquid crystal display, refreshable braille, or volumetric display), printer, or speaker etc. In some embodiments, the appliance 210 may also include at least one input device (e.g., a mouse, keyboard, controller, touch-sensitive display element, keypad, audio capture component, or build-in camera), or one or more storage devices, such as disk drives, optical storage devices and solid-state storage devices such as random access memory (RAM) or read-only memory (ROM), as well as removable media devices, memory cards, flash cards, etc.

The appliance 210 and the computing device 240 may also be connected to a server 250 via connections 203-207 and 205-207, respectively, or via separate and optional connections 209 and 211, respectively. The server 250 can be a Web server, or database server, including without limitation those commercially available from Oracle®, Microsoft®, Sybase® and IBM®. In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Pert, Python or TCL, as well as combinations thereof.

In this example, the security system 200 enables a user of the computing device 240 to gain control of at least one function of the appliance 210 over a network (e.g., Internet, wide area network (WAN), local area network (LAN), wireless mesh network, Internet area network (IAN), or near field communication (NFC)) by using a security protocol disclosed in this paper, such as HCBK, SHCBK, or hybrid-HCBK etc. Unlike most of protocols that have been proposed for insecure networks, the disclosed protocol can achieve a high level of authenticity of information that devices exchange although the device have no pre-shared information.

To start authentication process, the computing device 240 or the appliance 210 can initiate an authentication process by transmitting to the appliance 210 its identity together with other information, C and INFOc, that it wishes the appliance 210 to know for the purpose of this protocol, via the network 330. In response, the appliance 210 can send its corresponding information, A and INFOa, to the computing device 240, via the network 230.

In some embodiments, the authentication process 200 can start when either the computing device 240 or the appliance 210 senses the presence of the other device. For example, the appliance 210 may sense the computing device 240 is nearby through the at least one input device of the appliance 210 (e.g., a built-in-camera to detect the distance and/or identity of a user of the computing device 240), and/or other means (e.g., determine the distance of the computing device 240 via the a GPS location of the computing device 240, or a Bluetooth signal strength of the computing device 240). For another example, the computing device 240 may detect objects in the surrounding environment and recognize the appliance 210. In some embodiments, the computing device 240 may be configured to detect three dimensional map of surrounding environment and determine whether the appliance 210 is nearby by using one or more pattern matching algorithms.

Some embodiments disclose methods of generating and sharing a public key or a hash key between the appliance 210 and the computing device 240. In some embodiments, the appliance 210 and the computing device 240 can each generate a public key or a hash key and transmit it to the other device via a first communications channel in a first communications network, or in some instances, a second communications channel (e.g., an empirical channel 201). The public key can be generated by one or more public key algorithms (e.g., Diffie Hellman). The empirical channel 201 may include the use of LED laser light, infrared, ultrasonic, NFC, wired channel, audio channel, or the like. In some instances, the appliance 210 can display the public key on its display screen to be scanned by the computing device 240, or transmit the public key to the computing device 240 through certain light patterns or audio signals. In some embodiments, the public key can also be generated by the server 250 and assigned to the appliance 210. The public key can be transmitted to the computing device 240 through suitable channels from the server 250. For example, the server 250 generates a temporary public key and separately transmits the public key to the computing device 240 and the appliance 210 via the connections 207-205 and 207-203, respectively, or via the optional connections 211 and 209, respectively. In order to receive the public key, a user of the computing device 240 may be required to login to a user account on the server 250.

Upon receiving the public key, the computing device 240 can generate a new hash key hk and subsequently sends the appliance 210 a long hash of this value, longhash(hk), via the network 230. In some instances, the new hash key, hk, can be generated before receiving the public key from the appliance 210. Subsequently, the computing device 240 sends the appliance 210 the hash key hk under the shared public key, via the network 230. In some embodiments, the appliance 210 can check the value of the new hash key hk to see whether it produces the correct value for longhash(hk) and only proceeds if this is true. In some embodiments, the appliance 210 can generate a hash key to send to the computing device 240 and subsequently send the computing device 240 under the shared public key, via the network 230. The computing device 240 can check the value of the hash key to see whether it produces the correct value for the long hash of the hash key and only proceeds if this is true.

Both the appliance 210 and the computing device 240 generate a digest value of the information received, for example digest (hk, (C, INFOc, A, INFOa)). The digest value can be digits, hexadecimal, alphanumeric, sentences, words, names, symbols, barcodes, random arts, unique patterns, or the like. The digest value generated by the computing device 240 may be communicated to the appliance 210 via an empirical channel. The appliance 210 may be configured to compare the received digest value from the computing device 240 with a digest value generated on the appliance 210. In some embodiments, the digest value generated by the appliance 210 may be communicated to the computing device 240 via an empirical channel. The computing device 240 or a user of the computing device 240 can compare the received digest value from the appliance 210 with a digest value generated on the computing device 240. In some embodiments, a symmetric authentication process can be applied. The digest values generated by the computing device 240 and the appliance 210 can be authenticated on the appliance 210 and the computing device 240, respectively.

If any of the authentication checks fails, the authentication process is abandoned. In some embodiments, if the digest value from the computing device 240 is manually entered on the display of the appliance 210, the user of the computing device 240 may be prompted to re-enter the digest value generated by the computing device 240.

If the check is successful, the computing device 240 can take control of at least one function of the appliance 210 or enable a device to take control of at least one function of the appliance 210. For example, if the appliance 210 is a door lock or an air conditioner, upon a successful authentication process, the computing device 240 can unlock the door lock or manage settings of the air conditioner.

After initial authentication process, the user of the computing device 240 can choose to keep the process running so that the computing device 240 can maintain a control the appliance 210 within a predetermined period of time without requiring a new authentication process. However, within the predetermined period of time, the user of the computing device 240 can terminate the process and go through a new authentication process in a subsequent communication with the appliance 210.

Figure 3:
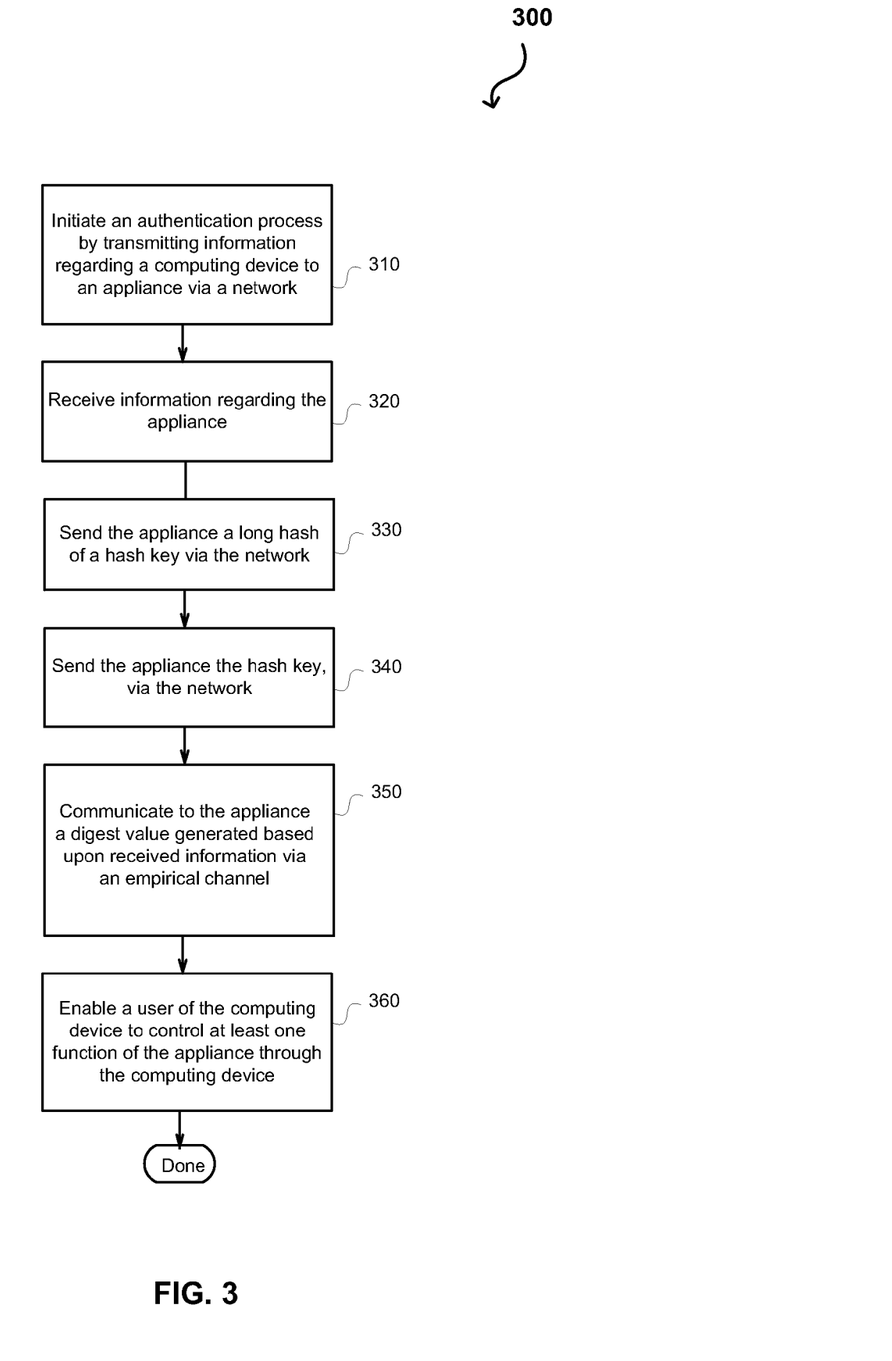
FIG. 3 illustrates another example process of authenticating communication between a computing device and an appliance in accordance with various embodiments.

FIG. 3 illustrates another example process 300 of authenticating communication in accordance with various embodiments. It should be understood that there can be additional, fewer, or alternative steps performed in similar or alternative orders, or in parallel, within the scope of the various embodiments unless otherwise stated. The example method embodiment 300 starts with initiating an authentication process, for instance by a computing device, by transmitting information regarding the computing device to an appliance via a network, at step 310. The network can be any insecure or secure network, such as Internet, wide area network (WAN), local area network (LAN), wireless mesh network, Internet area network (IAN), or near field communication (NFC) etc. At step 320, the computing device receives information regarding the appliance via the network. The appliance can generate a public key or a hash key and send the public key to the computing device via the network. In some instances, a public key is also generated by the computing device and communicated to the appliance via the network. In some embodiments, public-key algorithms that are used to generate the public key are based upon mathematical problems which currently admit no efficient solution that are inherent in certain factorization, discrete logarithm and elliptic curve relationships. In some embodiments, the public key is generated by a remote server that is coupled to the appliance.

A hash key can also be generated by the computing device. A long hash of the hash key can be sent from the computing device to the appliance, at step 330. Subsequently, the computing device can send the appliance the hash key or the hash key under the public key, via the network, at step 340. In some embodiments, the appliance can check the value of the hash key to see whether it produces the correct value for the long hash of the hash key and only proceeds if this is true.

A digest value can be generated based upon received information on the computing device and communicated to the appliance, via the empirical channel, at step 350. The empirical channel may include the use of LED laser light, infrared, ultrasonic, NFC, wired channel, audio channel, or the like. In response to a successful authentication by the appliance, a user of the computing device may take over the control at least one function of the appliance through the computing device, at step 360.

Figure 4:
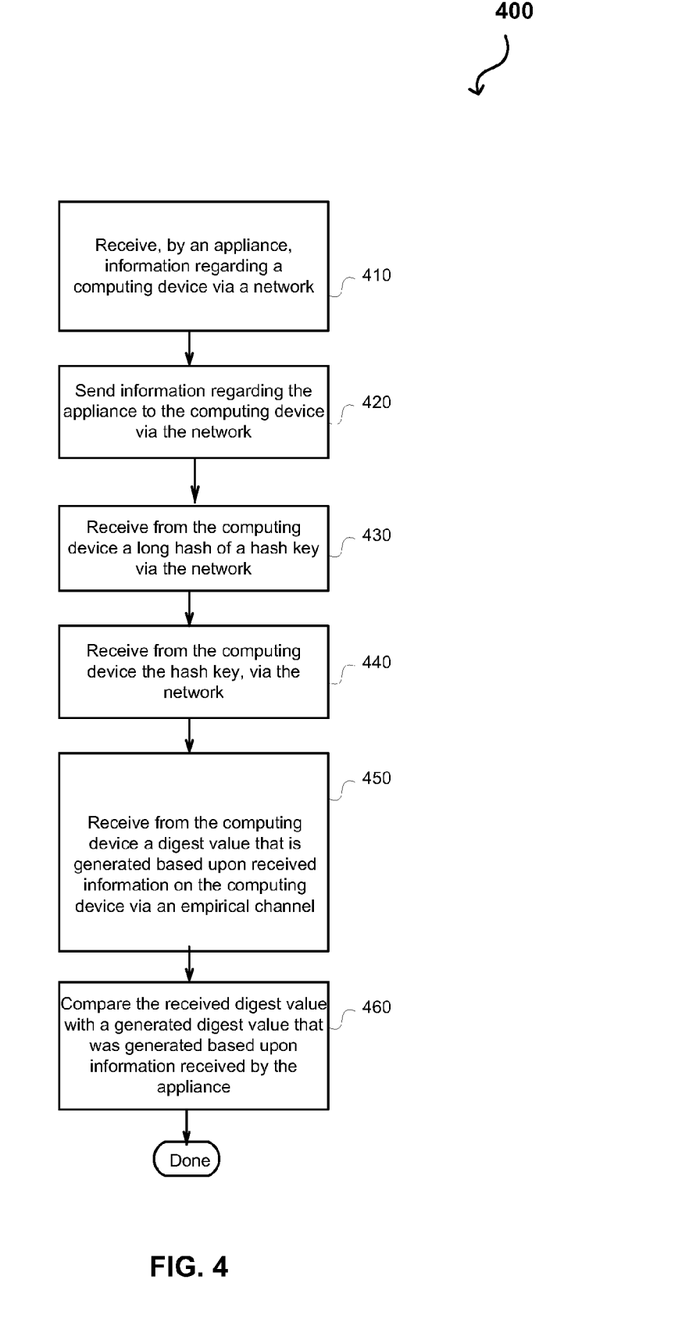
FIG. 4 illustrates yet another example process of authenticating communication between a computing device and an appliance in accordance with various embodiments.

FIG. 4 illustrates yet another example process 400 of authenticating communication in accordance with some embodiments. It should be understood that there can be additional, fewer, or alternative steps performed in similar or alternative orders, or in parallel, within the scope of the various embodiments unless otherwise stated. The example method embodiment 400 starts with receiving information regarding a computing device by an appliance, via a network, at step 410. Information regarding the appliance can be sent from the appliance to the computing device, via a network, at step 420. A public key or a hash key can be generated by the appliance and sent to the computing device via the network. In some embodiments, a public key is also generated by the computing device and communicated to the appliance via the network. A long hash of a hash key, longhash (hk), can be received from the computing device, via the network, at step 430. Subsequently, the hash key hk or the hash key hk under the public key can be received from the computing device, via the network, at step 440. The appliance can check the value of the hash key hk to see whether it produces the correct value for longhash(hk) and only proceed if this is true. The appliance can abandon the authentication process if the check fails.

The appliance receives from the computing device, a digest value that is calculated based upon received information on the computing device, via an empirical channel, at step 450. The empirical channel may include the use of the same or different LED laser channel, infrared channel, ultrasonic, NFC, wired channel, or audio channel. The appliance compares the received digest value with a digest value generated on the appliance, at step 460. If the check fails, the authentication process is abandoned. If the check is successful, the control of at least one function of the appliance can be handled over to the computing device.

Figure 5:
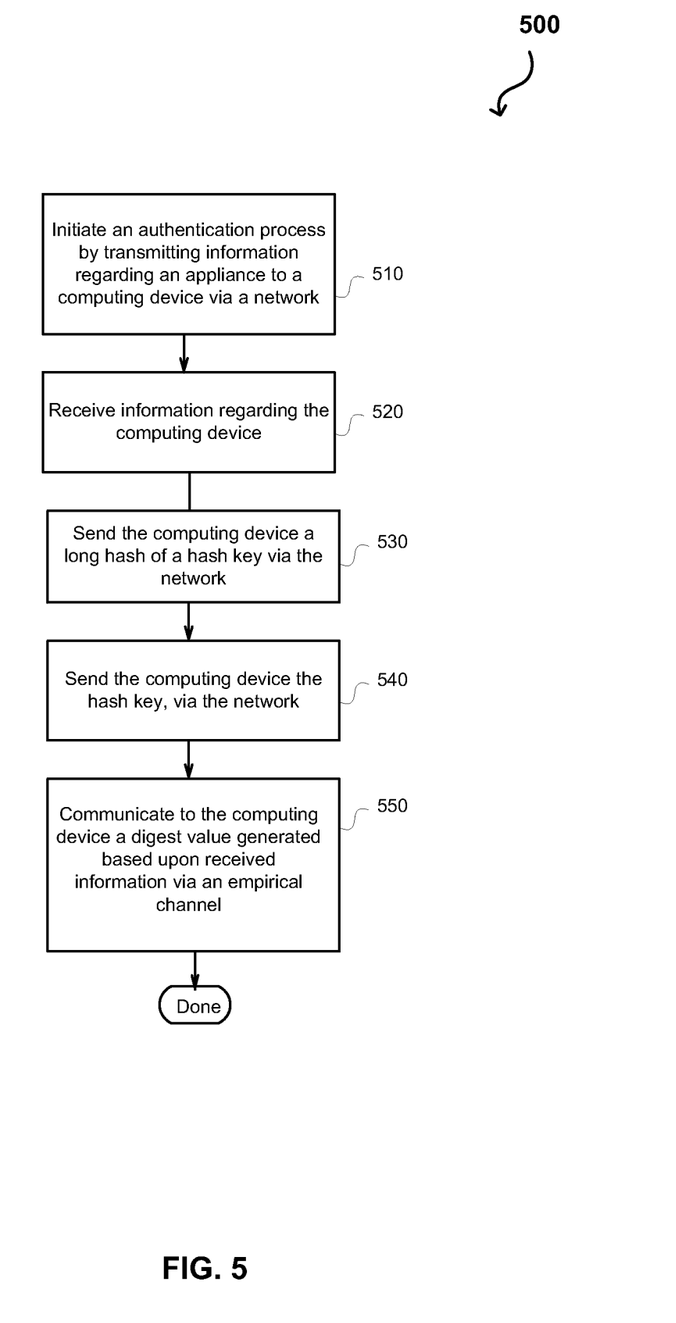
FIG. 5 illustrates yet another example process of authenticating communication between a computing device and an appliance in accordance with various embodiments.

FIG. 5 illustrates yet another example process 500 of authenticating communication in accordance with various embodiments. It should be understood that there can be additional, fewer, or alternative steps performed in similar or alternative orders, or in parallel, within the scope of the various embodiments unless otherwise stated. The example method embodiment 500 starts with initiating an authentication process, for instance by an appliance by transmitting information regarding the appliance to a computing device via a network, at step 510. The authenticating process may be initiated when the appliance senses that the computing device is nearby. At step 520, the appliance receives information regarding the appliance via the network.

The appliance can generate a hash key. A long hash of the hash key can be sent from the appliance to the computing device, at step 530. Subsequently, the appliance can send the appliance the hash key or the hash key under a public key, via the network, at step 540. In some embodiments, the computing device is configured to check the value of the hash key to see whether it produces the correct value for the received long hash of the hash key and only proceeds if this is true.

A digest value can be generated based on received information and communicated to the computing, via the empirical channel, at step 550. The empirical channel may include the use of LED laser light, infrared, ultrasonic, NFC, wired channel, audio channel, or the like. In some embodiments, the appliance also received a digest value from the computing device via the empirical channel. The appliance is configured to compare the received digest value and received digest value. In response to a successful authentication by the appliance, the appliance is configured to receive one or more instructions from the computing device.

Figure 6:
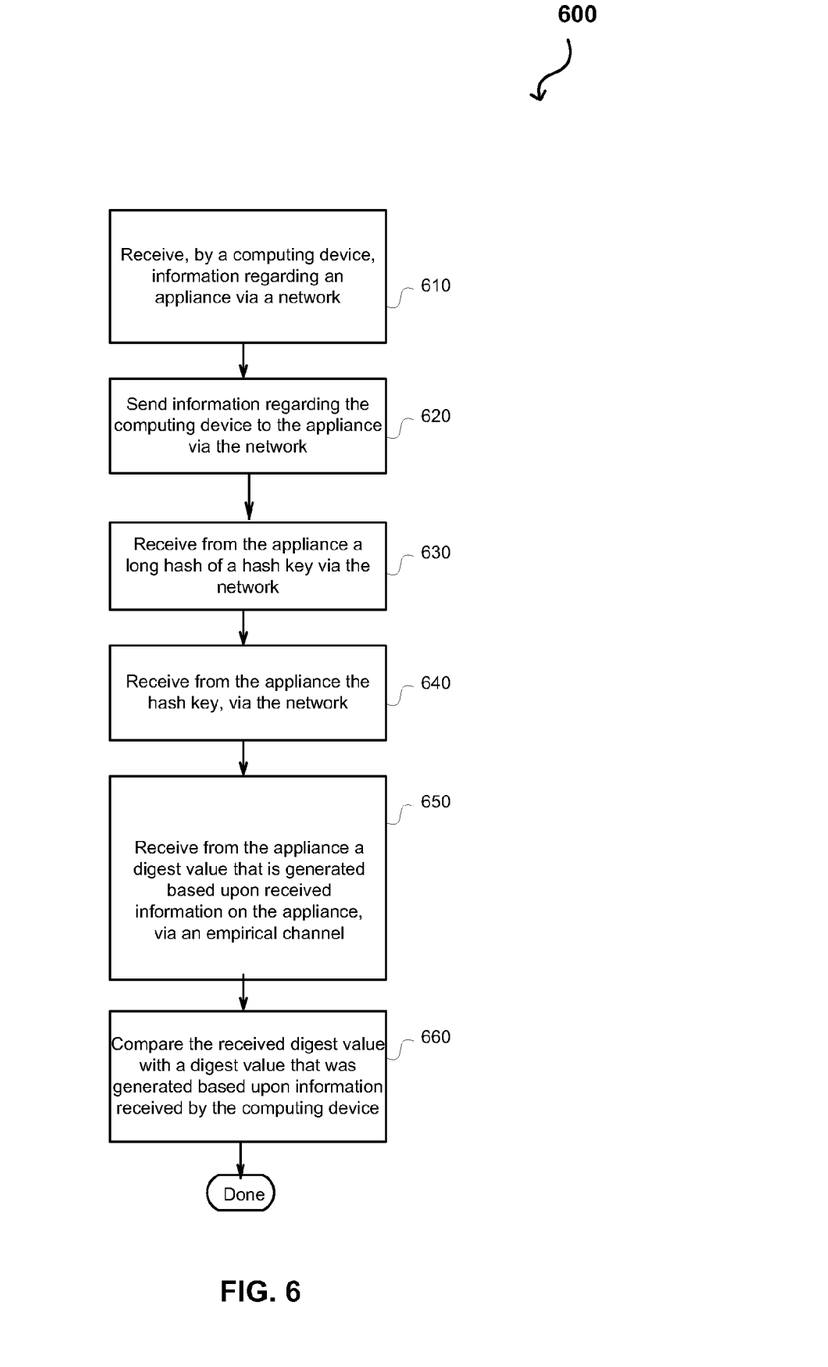
FIG. 6 illustrates yet another example process of authenticating communication between a computing device and an appliance in accordance with various embodiments.

FIG. 6 illustrates another example process 600 of authenticating communication in accordance with some embodiments. It should be understood that there can be additional, fewer, or alternative steps performed in similar or alternative orders, or in parallel, within the scope of the various embodiments unless otherwise stated. The example method embodiment 600 starts with receiving information regarding an appliance by a computing device, via a network, at step 610. Information regarding the computing device can be sent from the computing device to the appliance, via a network, at step 620. A long hash of a hash key can be received from the computing device, via the network, at step 630. Subsequently, the hash key or the hash key under a public key can be received from the appliance, via the network, at step 640. The computing device can check the value of the hash key to see whether it produces the correct value for the received long hash of the hash key and only proceed if this is true. The computing device can abandon the authentication process if the check fails.

The computing device receives from the appliance, a digest value that is calculated based upon received information on the appliance, via an empirical channel, at step 650. The empirical channel may include the use of the same or different LED laser channel, infrared channel, ultrasonic, NFC, wired channel, or audio channel. The computing device compares the received digest value with a digest value generated on the appliance, at step 660. If the check fails, the authentication process is abandoned. If the check is successful, the computing device may send one or more instructions to control at least one function of the function (e.g., send a secret key to open a lock).

Various embodiments of the present disclosure provide methods for providing communication security. While specific examples have been cited above showing how the optional operation may be employed in different instructions, other embodiments may incorporate the optional operation into different instructions. For clarity of explanation, in some instances the present disclosure may be presented as including individual functional blocks including functional blocks comprising devices, device components, steps or routines in a method embodied in software, or combinations of hardware and software.

Figure 7:
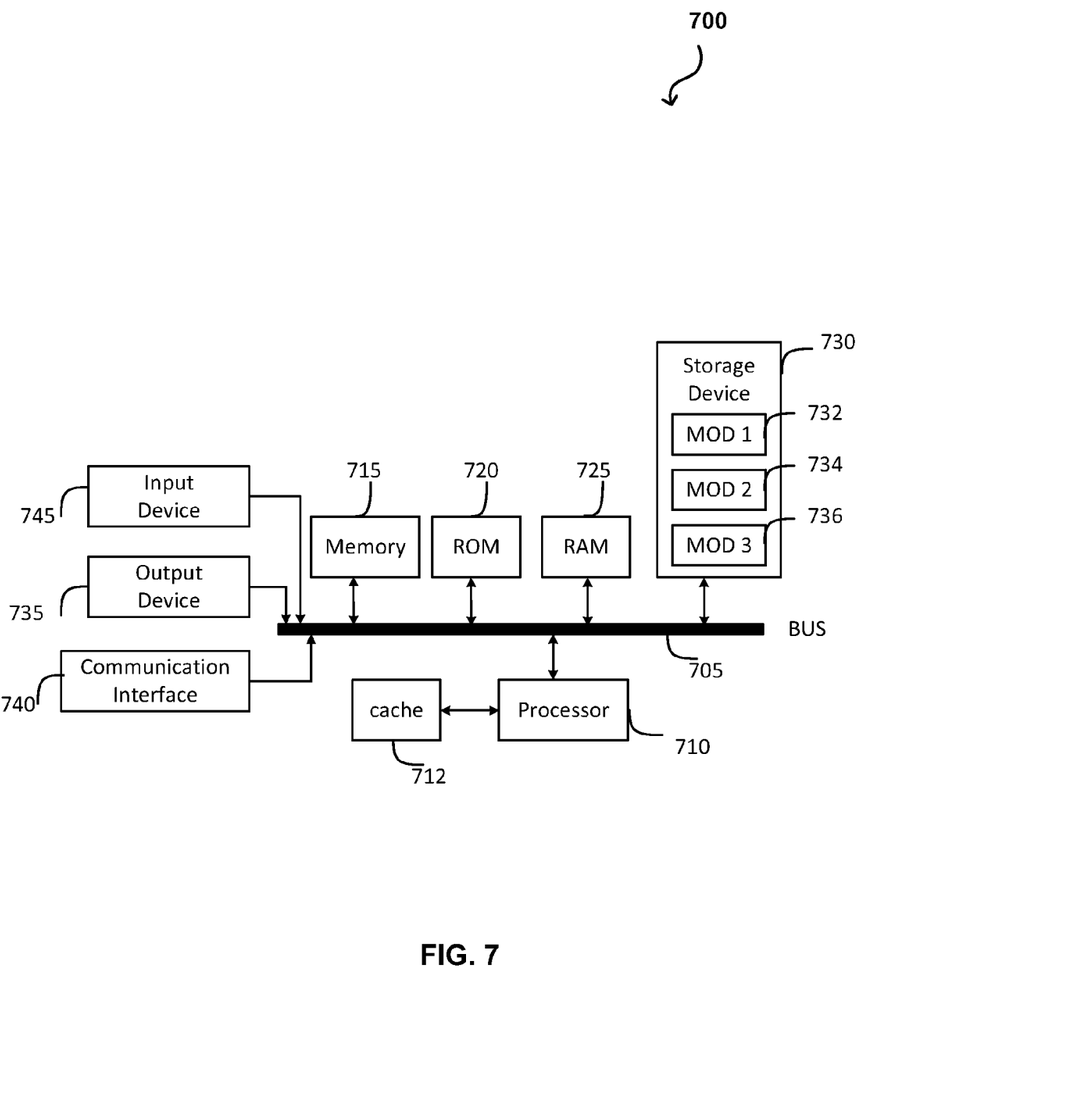
FIG. 7 illustrates a conventional computing system architecture that can be used to implement aspects of the various embodiments.

FIG. 7 illustrates a conventional computing system architecture 700 that can be used to implement aspects of the various embodiments. The more appropriate embodiment will be apparent to those of ordinary skill in the art when practicing the present technology. However, it will be appreciated by those of ordinary skill in the art that such a computing device could operate equally well in a computing device having fewer or a greater number of components than are illustrated in FIG. 7. Thus, the depiction of the system 700 in FIG. 7 should be taken as being illustrative in nature and not limiting to the scope of the disclosure.

In this example, the components of the conventional computing system architecture 700 are in electrical communication with each other using a bus 705. Exemplary system 700 includes a processing unit (CPU or processor) 710 and a system bus 705 that couples various system components including the system memory 715, such as read only memory (ROM) 720 and random access memory (RAM) 725, to the processor 710. The system 700 can include a cache of high-speed memory connected directly with, in close proximity to, or integrated as part of the processor 710. The system 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware module or software module, such as module 732, module 734, and module 736 stored in storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing device 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include software modules 732, 734, 736 for controlling the processor 710. Other hardware or software modules are contemplated. The storage device 730 can be connected to the system bus 705. In one aspect, a hardware module that performs a particular function can include the software component stored in a computer-readable medium in connection with the necessary hardware components, such as the processor 710, bus 705, display 735, and so forth, to carry out the function.

The various embodiments can be further implemented in a wide variety of operating environments, which in some cases can include one or more server computers, user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

To the extent embodiments, or portions thereof, are implemented in hardware, the present disclosure may be implemented with any or a combination of the following technologies: a discrete logic circuit(s) having logic gates for implementing logic functions upon data signals, an application specific integrated circuit (ASIC) having appropriate combinational logic gates, programmable hardware such as a programmable gate array(s) (PGA), a field programmable gate array (FPGA), etc.

Most embodiments utilize at least one network that would be familiar to those skilled in the art for supporting communications using any of a variety of commercially-available protocols, such as TCP/IP, OSI, FTP, UPnP, NFS, CIFS, AppleTalk etc. The network can be, for example, a local area network, a wide-area network, a virtual private network, the Internet, an intranet, an extranet, a public switched telephone network, an infrared network, a wireless network and any combination thereof.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing methods according to these disclosures can comprise hardware, firmware and/or software, and can take any of a variety of form factors. Typical examples of such form factors include server computers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

Such devices can also include a computer-readable storage media reader, a communications device (e.g., a modem, a network card (wireless or wired), an infrared computing device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and computing media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of authenticating a first device using a communications protocol, comprising:
   establishing, by a second device, a secure mode of communications between the first and second devices through a first communications channel over an insecure communications network,
      wherein the second device comprises at least one of a door lock, automatic garage door opener, remote car starter, sprinkler system, safety box, thermostat, safety detector, air conditioner, dishwasher, clothes dryer, freezer, refrigerator, kitchen stove, water heater, washing machine, microwave ovens, induction cooker, TV set, CD/DVD player, camcorder, still camera, digital clock, alarm clock, video game console, home cinema, or answering machine;
   receiving a public key from the first device, via the first communications channel;
   receiving, from the first device, a long hash of a hash key via the first communications channel;
   receiving, from the first device, the hash key under the public key, via the first communications channel;
   checking, by the second device, the received hash key to determine whether the received hash key produces the correct value for the long hash of the hash key;
   sending information of the second device to the first device, via the first communications channel, if the received hash key produces the correct value for the long hash of the hash key;
   receiving, by the second device, a digest value from the first device over a second communications channel, the digest value from the first device generated based at least upon information transmitted from the second device, wherein the second communication channel includes one or more connections via an ultrasonic channel;
   authenticating the first device by the second device if the received digest value is consistent with a calculated digest value by the second device, the second device configured to compare the received digest value with the calculated digest value,
   wherein the calculated digest value is determined, using a pseudo-random number generator (PRNG) of the second device, by steps comprising:
      initializing a first memory store and a second memory store of the PRNG for storing strings of bits by shifting each of the lengths of bits in a predetermined manner;
      initializing the length of bits in each memory store with values functionally dependent on a key;
      storing a first length of pseudo-random bits in the first memory store; storing a second length of bits of digest information in the second memory store; and
      operating on both the stored strings of bits in each of the first memory store and the second memory store to produce the calculated digest value; and
   in response to the received digest value from the first device being consistent with the calculated digest value on the second device, enabling the first device to send one or more instructions to control at least one function of the second device.

2. The computer-implemented method of claim 1, wherein the calculated digest value is in the format of at least one of digits, hexadecimal, alphanumeric, sentences, words, names, symbols, barcodes, random arts, or unique patterns.

3. The computer-implemented method of claim 1, wherein the calculated digest value is a digest function of (hk,n), in which, for any distinct n1 and n2, as hk varies uniformly over c-bit values, the probability that digest(hk, n1)=digest(hk,n2) is less than $2^{-c}$, and the length c of the digests value is selected so that a probability of a successful attack rate of $2^{-c}$ is acceptable.

4. The computer-implemented method of claim 1, wherein the first device or the second device includes at least one central processing unit (CPU), one network connector, and at least one output device.

5. The computer-implemented method of claim 4, wherein the at least one output device includes at least one of a LED, flat panel, liquid crystal display, refreshable braille, or volumetric display.

6. The computer-implemented method of claim 4, wherein the first device or the second device includes at least one input device from a group comprising a mouse, keyboard, controller, touch-sensitive display element, keypad, audio capture component, and build-in camera.

7. A computer-implemented method of an authentication process, comprising:
receiving, by an appliance, information of a computing device, via a network,
wherein the appliance comprises at least one of a door lock, automatic garage door opener, remote car starter, sprinkler system, safety box, thermostat, safety detector, air conditioner, dishwasher, clothes dryer, freezer, refrigerator, kitchen stove, water heater, washing machine, microwave ovens, induction cooker, TV set, CD/DVD player, camcorder, still camera, digital clock, alarm clock, video game console, home cinema, or answering machine;
receiving a public key from the computing device, via the network;
receiving, from the computing device, a long hash of a hash key via the network;
receiving, from the computing device, the hash key under the public key, via the network;
checking, by the appliance, the received hash key to determine whether the received hash key produces the correct value for the long hash of the hash key;
abandoning the authentication process if the check fails;
sending information of the appliance to the computing device, via the network;
receiving, from the computing device, a digest value generated based upon information collected by the computing device via an empirical channel, wherein the empirical channel includes one or more connections via an ultrasonic channel;
comparing, by the appliance, the received digest value with a generated digest value that was generated based upon information collected by the appliance;
abandoning the authentication process if the received digest value is not consistent with the generated digest value; and
in response to the digest value from the computing device being consistent with the generated digest value on the appliance, enabling the computing device to send one or more instructions to control at least one function of the appliance,
wherein the generated digest value is determined, using a pseudo-random number generator (PRNG) of the appliance, by steps comprising:
initializing a first memory store and a second memory store of the PRNG for storing strings of bits by shifting each of the lengths of bits in a predetermined manner;
initializing the length of bits in each memory store with values functionally dependent on a key;
storing a first length of pseudo-random bits in the first memory store; storing a second length of bits of digest information in the second memory store; and
operating on both the stored strings of bits in each of the first memory store and the second memory store to produce the generated digest value.

8. The computer-implemented method of claim 7, wherein the generated digest value is in the format of at least one of digits, hexadecimal, alphanumeric, sentences, words, names, symbols, barcodes, random arts, or unique patterns.

9. The computer-implemented method of claim 7, wherein the calculated digest value is a digest function of (hk,n), in which, for any distinct n1 and n2, as hk varies uniformly over c-bit values, the probability that digest(hk, n1)=digest(hk,n2) is less than $2^{-c}$, and the length c of the digests value is selected so that a probability of a successful attack rate of $2^{-c}$ is acceptable.

10. The computer-implemented method of claim 7, wherein the appliance includes at least one central processing unit (CPU), a network connector, and at least one output device.

11. The computer-implemented method of claim 10, wherein the at least one output device includes at least one of a LED, flat panel, liquid crystal display, refreshable braille, or volumetric display.

12. The computer-implemented method of claim 10, wherein the appliance includes at least one input device from a group comprising a mouse, keyboard, controller, touch-sensitive display element, keypad, audio capture component, and build-in camera.

13. The computer-implemented method of claim 7, wherein the public key is randomly generated by the appliance, the computing device, or the trusted server.

14. A computer-implemented method of an authentication process, comprising:
sending, to an appliance, information of a computing device, via a network,
wherein the appliance comprises at least one of a door lock, automatic garage door opener, remote car starter, sprinkler system, safety box, thermostat, safety detector, air conditioner, dishwasher, clothes dryer, freezer, refrigerator, kitchen stove, water heater, washing machine, microwave ovens, induction cooker, TV set, CD/DVD player, camcorder, still camera, digital clock, alarm clock, video game console, home cinema, or answering machine;
sending a first public key to the appliance, via the network;
sending to the appliance a long hash of a first hash key, via the network;
sending to the appliance the first hash key under the first public key, via the network;
receiving, from the appliance, information of the appliance via the network;

receiving, from the appliance, a long hash of a second hash key via the network;

receiving, from the appliance, the second hash key, via the network;

determining that the received second hash key produces the correct value for the long hash of the second hash key;

sending, to the appliance by the computing device via an empirical channel, a digest value generated based upon information collected by the computing device via the network, wherein the empirical channel includes one or more connections via an ultrasonic channel; and in response to the digest value generated on the computing device being consistent with a generated digest value on the appliance, sending one or more instructions by the computing device to control at least one function of the appliance, wherein the generated digest value is determined, using a pseudo-random number generator (PRNG) of the appliance, by steps comprising:

initializing a first memory store and a second memory store of the PRNG for storing strings of bits by shifting each of the lengths of bits in a predetermined manner;

initializing the length of bits in each memory store with values functionally dependent on a key;

storing a first length of pseudo-random bits in the first memory store; storing a second length of bits of digest information in the second memory store; and operating on both the stored strings of bits in each of the first memory store and the second memory store to produce the generated digest value.

15. The computer-implemented method of claim 14, further comprising:

determining that the received second hash key does not produce the correct value for the long hash of the second hash key; and abandoning the authentication process.

16. The computer-implemented method of claim 14, wherein the calculated digest value is a digest function of (hk,n), in which, for any distinct n1 and n2, as hk varies uniformly over c-bit values, the probability that digest(hk, n1)=digest(hk,n2) is less than $2^{-c}$, and the length c of the digests value is selected so that a probability of a successful attack rate of $2^{-c}$ is acceptable.

17. The computer-implemented method of claim 14, wherein the public key is randomly generated by the appliance, the computing device, or the trusted server.

18. The computer-implemented method of claim 14, wherein the appliance includes at least one central processing unit (CPU), a network connector, and at least one output device.

19. The computer-implemented method of claim 18, wherein the at least one output device includes at least one of a LED, flat panel, liquid crystal display, refreshable braille, or volumetric display.

20. The computer-implemented method of claim 18, wherein the appliance includes at least one input device from a group comprising a mouse, keyboard, controller, touch-sensitive display element, keypad, audio capture component, and build-in camera.

* * * * *